No. 878,477. PATENTED FEB. 4, 1908.
R. B. BREWER.
CORN HARVESTER.
APPLICATION FILED APR. 3, 1907.
3 SHEETS—SHEET 1.
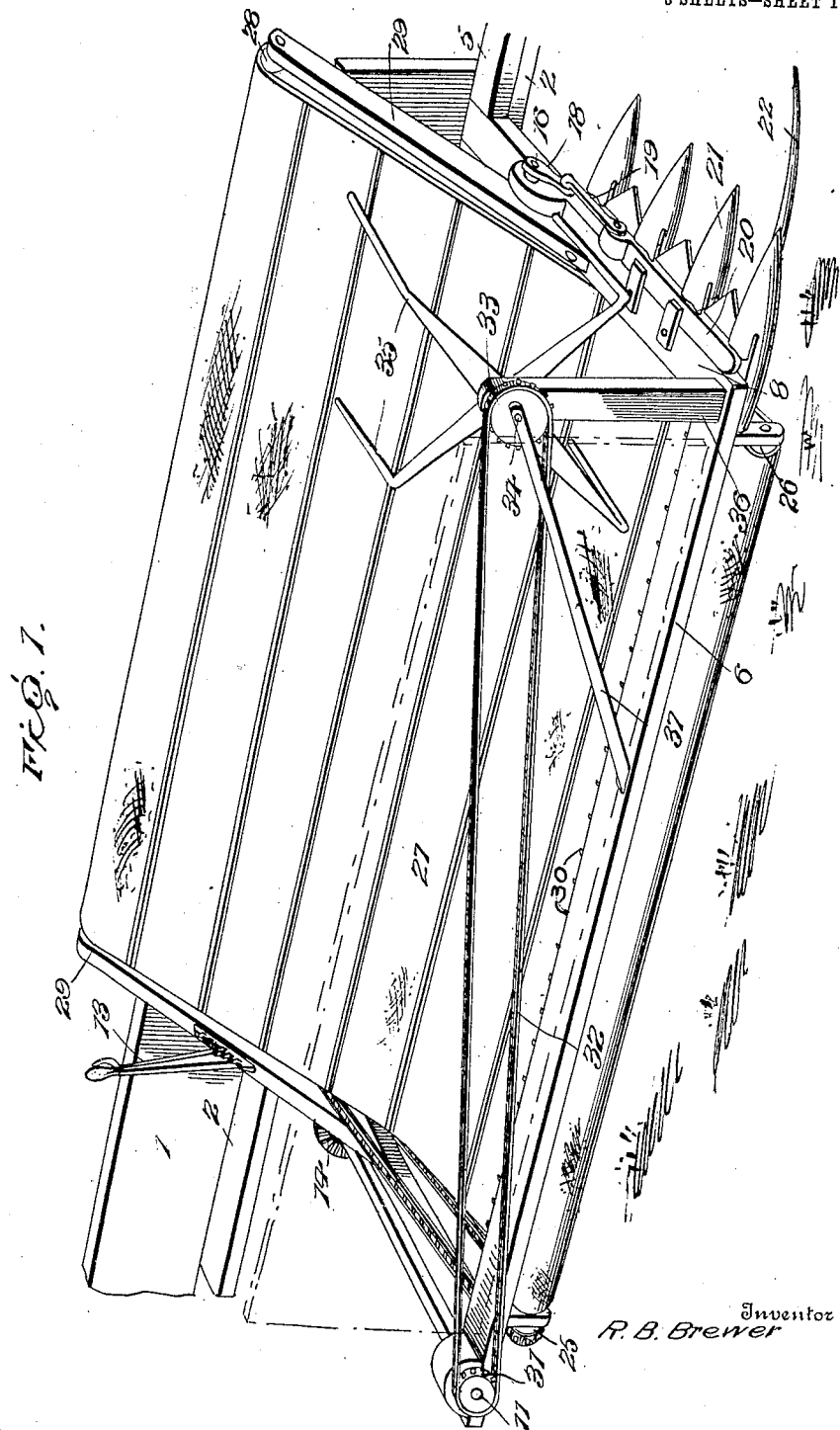
Witnesses
Inventor
R. B. Brewer
By
Lacey, Attorney No. 878,477.
PATENTED FEB. 4, 1908.
R. B. BREWER.
CORN HARVESTER.
APPLICATION FILED APR. 3, 1907.
3 SHEETS—SHEET 2.
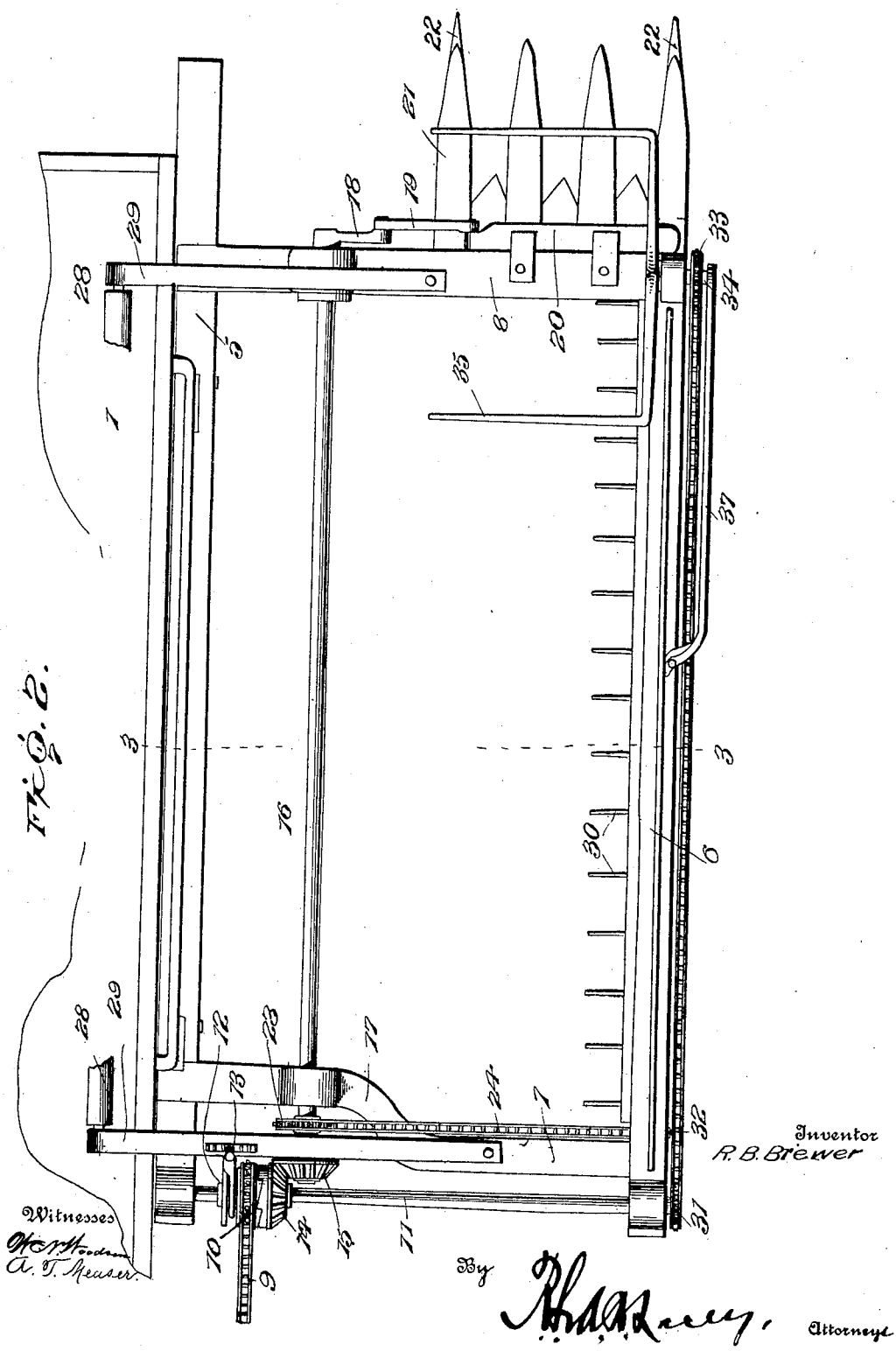
Witnesses
Inventor
R. B. Brewer
By 
Attorneys No. 878,477.

PATENTED FEB. 4, 1908.

R. B. BREWER.
CORN HARVESTER.
APPLICATION FILED APR. 3, 1907.

3 SHEETS—SHEET 3.

UNITED STATES PATENT OFFICE.

ROBERT B. BREWER, OF OXFORD, KANSAS, ASSIGNOR OF ONE-HALF TO S. R. PAYNE, OF OXFORD, KANSAS.

CORN-HARVESTER.

No. 878,477.  Specification of Letters Patent.  Patented Feb. 4, 1908.

Application filed April 3, 1907. Serial No. 366,147.

*To all whom it may concern:*

Be it known that I, ROBERT B. BREWER, citizen of the United States, residing at Oxford, in the county of Sumner and State of Kansas, have invented certain new and useful Improvements in Corn-Harvesters, of which the following is a specification.

This invention contemplates certain new and useful improvements in harvesters, and more particularly to machines for harvesting Kafir corn, and the invention has for its object a simple, durable and efficient construction of harvester which may be readily applied to either side of a farm wagon and caused to travel over the fields so as to cut the corn and lift it in a side-wise direction and deposit it in the body of the wagon.

With this and other objects in view as will more fully appear as the description proceeds, the invention consists in certain constructions, arrangements and combinations of the parts, which I shall hereinafter fully describe and then point out the novel features in the appended claims.

For a full description of the invention and the merits thereof and also to acquire a knowledge of the details of construction, of the means for effecting the result, reference is to be had to the following description and accompanying drawings, in which:

Figure 1 is a perspective view, illustrating a harvester constructed in accordance with my invention. Fig. 2 is a top plan view thereof. Fig. 3 is a transverse sectional view thereof, the section being taken approximately on the line 3—3 of Fig. 2. Figs. 4 and 5 are respectively, detail perspective and longitudinal sectional views, of the detachable supporting connection between the wagon body and the harvester frame. Fig. 6 is a detail perspective view of one of the outside knife bars with its gathering fork projecting therefrom.

Corresponding and like parts are referred to in the following description and indicated in all the views of the drawings by the same reference characters.

Referring to the drawings, the numeral 1 designates the portion of a wagon body to one side of which there is secured a running board 2. This board is provided with slots 3 in which the pivot bars 4 are accommodated, said bars extending downwardly through the slots and supporting the inner sill 5 of the harvester frame-work directly upon the running board. The frame-work embodies, in addition to the sill 5, the outer sill 6 and cross sills 7 and 8, rear and front, respectively.

The rear wheel of the vehicle may be provided with a sprocket wheel, (not shown). A chain 9 extends over said wheel and also over a sprocket wheel 10 on the drive shaft 11, which extends transversely of the harvester frame at the rear of the rear sill 7. The sprocket 10 of the drive shaft 11 is loose thereon and is adapted to be coupled to the shaft by means of a clutch 12, operated by a hand lever 13, as clearly indicated in the drawings. A bevel pinion 14 is fast on the shaft 11 and meshes with a similar pinion 15, on the longitudinally extending shaft 16 which is journaled near the cross sills and in a bracket 17. At its front end, the shaft 16 carries a crank 18 which is operatively connected by means of a pitman 19 to the transversely reciprocating cutter bar 20 carrying a series of teeth adapted to work through slots in the forwardly projecting guard fingers 21. The end guard fingers may be provided with diverging gathering forks 22.

Near its rear end the shaft 16 carries a sprocket wheel 23, and a sprocket chain 24 connects said wheel with a similar wheel 25 on the shaft of a roller 26 for the transversely traveling conveyer and elevator 27. 28 designates the inner and higher roller of said elevator, the latter being journaled in the ends of oblique standards 29, adapted to project inwardly over the side of the wagon body.

30 designates a series of spring fingers which project inwardly from the outer sill 6, over the elevator.

The elevator is preferably provided with a series of lags, as shown, so as to carry the cut corn in a sidewise direction and deposit it in the wagon body.

The outer end of the main driving shaft 11 carries a sprocket wheel 31 which is connected by a forwardly extending chain 32 with a similar wheel 33 on the reel shaft 34.

35 designates the reel, which is mounted to revolve over the cutting mechanism. The shaft 34 of the reel is journaled in a post 36 mounted at the corner of the framework, and said post is preferably braced by means of a rod 37.

From the foregoing description in connection with the accompanying drawings, it is evident that as the wagon with the harvester attachment travels over the fields, the power derived from the rearward traveling wheel will be imparted to the drive shaft 11 and thence to the cutter shaft 16, which will impart a reciprocating motion to the cutter bar 20 and cut the corn. As the cut corn falls upon the elevator 27, it will be carried thereby upwardly and inwardly and be deposited in an evident manner within the wagon body 1. The entire mechanism may be thrown out of operation by the clutch handle 12, and this handle may be manipulated by an attendant standing upon the running board 2.

The spring fingers 30 project over the canvas of the elevator and keep the heads of corn cut from passing between the elevator and the sill 6.

Having thus described the invention, what is claimed as new is:

1. A harvester attachment of the character described, comprising a supporting frame-work embodying inner and outer sills, the inner sill being provided with pivoted latch bars, in combination with a vehicle body provided with a running board formed with slots to receive said latch bars, cutting mechanism carried by said frame-work and projecting forwardly therefrom, means for actuating said cutting mechanism, and a transversely traveling elevator carried by said frame-work and adapted to operate in the rear of the cutting mechanism, and means for operating said elevator.

2. A harvester attachment of the character described, comprising a supporting frame-work, means for supporting the same from a wagon body, a drive-shaft journaled in the rear of said frame-work, a cutter shaft extending longitudinally of the frame-work and journaled therein, a driving connection between said drive shaft and the cutter shaft, guard fingers projecting forwardly from the frame-work, a cutter bar adapted to reciprocate through said guard fingers and having a pitman and crank connection with the cutter shaft, a transversely traveling elevator embodying an apron and rollers, the apron being formed with lags, upwardly and transversely extending standards adapted to project over the wagon body supporting the innermost roller of the elevator, a driving connection between said elevator and the cutter shaft, a reel mounted in the frame-work above the guard fingers, means for actuating said reel, and spring fingers projecting from the framework above the outer end of the elevator.

3. A harvester attachment of the character described, comprising a supporting frame-work, means for supporting the same from a wagon body, a drive shaft journaled in the rear of the frame-work, a cutter shaft extending longitudinally of the framework and journaled therein, a driving connection between said drive shaft and the cutter shaft, cutting mechanism operatively connected to the cutter shaft, a transversely traveling elevator embodying an apron and rollers, the apron being formed with lags, upwardly and transversely extending standards mounted on the framework and adapted to project over the wagon body and supporting the innermost roller of the elevator, a driving connection between the cutter shaft and the other roller of the elevator, a reel mounted in the frame-work above the cutting mechanism, and an operative connection between said reel and the drive shaft.

In testimony whereof I affix my signature in presence of two witnesses.

ROBERT B. BREWER. [L. S.]

Witnesses:
M. B. LIGHT,
C. L. CROOKHAM.